(12) United States Patent
Smith et al.

(10) Patent No.: US 7,063,252 B2
(45) Date of Patent: Jun. 20, 2006

(54) CENTRALIZED ELECTRONIC SAFE AND ACCOUNTING CONTROL SYSTEM

(75) Inventors: Michael J. Smith, Scottsburg, IN (US); Jonathan Bosch, Hillsboro, OR (US); Richard Thurman, Louisville, KY (US); Mark Edward Thomas, Corydon, IN (US); Richard R. Cornell, Jr., New Albany, IN (US); Jane Mary Chernomordik, Louisville, KY (US)

(73) Assignee: FireKing International, Inc., New Albany, IN (US)

( * ) Notice: Subject to any disclaimer, the term of this patent is extended or adjusted under 35 U.S.C. 154(b) by 818 days.

(21) Appl. No.: 09/825,912

(22) Filed: Apr. 4, 2001

(65) Prior Publication Data

US 2002/0147598 A1   Oct. 10, 2002

(51) Int. Cl.
*G06Q 40/00* (2006.01)
(52) U.S. Cl. .................... 235/379; 235/382; 235/382.5; 235/383; 705/16
(58) Field of Classification Search ................ 235/379, 235/375, 382, 382.5, 383, 380; 705/16, 30
See application file for complete search history.

(56) References Cited

U.S. PATENT DOCUMENTS

| | | | | |
|---|---|---|---|---|
| 4,502,120 A | * | 2/1985 | Ohnishi et al. ................ 705/21 |
| 5,164,718 A | * | 11/1992 | Cedergren .................. 340/5.26 |
| 5,340,967 A | * | 8/1994 | Martin et al. ................ 235/379 |
| 5,557,086 A | * | 9/1996 | Schulze et al. ............. 235/380 |
| 5,725,081 A | * | 3/1998 | Meeker ....................... 194/206 |
| 5,883,371 A | * | 3/1999 | Meeker ....................... 235/379 |
| 5,900,607 A | * | 5/1999 | Awatsu et al. ............... 235/379 |
| 6,067,530 A | * | 5/2000 | Brooks et al. ................. 705/30 |
| 6,105,864 A | * | 8/2000 | Shiobara et al. ............ 235/379 |
| 6,724,303 B1 | | 4/2004 | McGunn et al. |
| 6,885,281 B1 | | 4/2005 | McGunn et al. |
| 2004/0201472 A1 | | 10/2004 | McGunn et al. |
| 2005/0144996 A1 | | 7/2005 | McGunn et al. |

* cited by examiner

*Primary Examiner*—Steven S. Paik
(74) *Attorney, Agent, or Firm*—Brooks Kushman P.C.

(57) ABSTRACT

An electronic lock and money control system is provided that is capable of single unit stand-alone operation, as well as expandability to a network of multiple units having one of the units operate as a centralized network controller. The network includes at least one safe provided with a control system arranged to communicate with a data input device, electronic display, connector interface and electronic lock mechanism located on the safe. The control system includes a processor programmed to control operation of the electronic lock mechanism, as well as operate as a central system controller when connected to at least one other remote safe via the connector interface to monitor and accumulate financial and operational information for each remote unit. Thus, the safe can be used in stand-alone operation, or as a central control and reporting unit for a network of interconnected safes.

26 Claims, 5 Drawing Sheets

CENTRALIZED ELECTRONIC SAFE AND ACCOUNTING CONTROL SYSTEM

BACKGROUND OF THE INVENTION

1. Field of the Invention

The present invention relates to electronic lock and money control systems such as used by merchants to collect and dispense money during business operation, and more particularly to a system capable of stand alone operation as well as expanded networking and control of multiple electronic lock and money collection/dispensing units.

2. Background Art

Generally, because merchants tend to maintain only a minimal amount of money in cash registers, accumulated money/cash is periodically transferred to a on-site safe or drop box. This reduces the amount of money present at a cash register and potential exposure to loss do to robbery. Some safes include electronic money verification and change dispensing units which allow the safes to not only receive money, but to provide some form of automation for dispensing money as well as making change. As a result, money can be exchanged for smaller, denominations and coins, or deposited for security and accounting.

In the case of large business establishments, numerous safe units may be located at various locations throughout the store. Unfortunately, management, accounting, and oversight/maintenance of each machine requires long and tedious efforts. In addition, integration of additional units into an existing business generally requires a large expenditure to replace existing units for more sophisticated units. As a result, a need exists for an electronic lock and money control system and corresponding system units capable of cost effectively integrating additional system units, as well as provide more efficient system management and accounting operations to improve overall safekeeping, receiving, dispensing and accounting of money within the system.

SUMMARY OF THE INVENTION

Therefore, it is an object of the present invention to provide an electronic lock and money control system capable of single unit stand-alone operation, as well as expandability to a network of multiple units having one of the units operate as a centralized network controller.

In accordance with this and other objects, the present invention provides an electronic lock and money control system having at least one safe that includes a housing having an interior compartment for securing money, and an outer door having an electronic lock mechanism to control access to the interior compartment. The safe also includes a data input device, an electronic display, a connector interface mounted to the housing, and a control system arranged to communicate with the data input device, electronic display, connector interface and electronic lock. The control system includes a processor programmed to control operation of the electronic lock mechanism, as well as operate as a central system controller when connected to at least one other remote safe via the connector interface to monitor and accumulate financial and operational information for each remote unit.

In accordance with one aspect of the present invention, the processor can be programmed to recognize different levels of system authority. The at least one safe can further include a bill validator apparatus mounted to the housing for receiving and validating bills of various denominations, and a storage device located within the safe for storing all validated bills. The processor is programmed to maintain a record of all received and validated bills.

In accordance with another aspect of the present invention, the at least one safe can include a cash dispensing apparatus mounted to the housing. The cash dispensing apparatus includes a set of openings in the housing arranged to be loaded with containers each containing money of a predetermined value, and a separate opening and dispensing tray in the housing to dispense cash containers for removal from the safe.

Still further, the at least one safe can be connected to at least one remote safe unit via the connector interface. Remote safes can include bill validators and/or cash dispensing apparatus. In each case, the central processor is programmed to maintain a record of all money received and dispensed by each of the remote safes. The central processor can be further programmed to accumulate and track deposits and withdrawals of money, recognize user identification data, and store transaction data and associated user identity data in a memory for each remote unit. The processor can then process and sort stored transaction and operational data to generate an individual and totaled audit and accounting reports.

In accordance with yet another aspect of the present invention, a network of interconnected electronic locking and money control devices is provided having a central processing system integrated with one of the electronic locking and money control devices and arranged to control operation of the integrated device, wherein the central processing system is connected to all other network devices, and further arranged to communicate with all the other network devices and provide network control of all the other devices.

These and other objects, features, and advantages of the present invention will be readily apparent from the following detailed description of the best mode for carrying out the invention when taken in connection with the accompanying drawings.

DETAILED DESCRIPTION OF THE PREFERRED EMBODIMENT(S)

The present invention provides a stand alone electronic lock and money collection/dispensing unit, i.e., safe, that can also operate as a centralized network control unit when coupled to one or more remote electronic lock and money collection/dispensing units.

Figure 1:
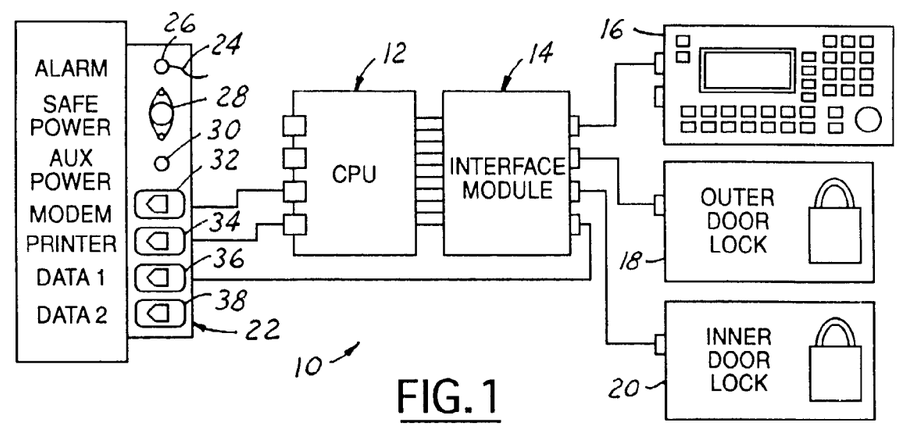
FIG. 1 is a block circuit diagram of a safe/central network control unit in accordance with a first embodiment.

FIG. 1 illustrates a block circuit diagram of a safe/central network control unit 10 in accordance with a first embodiment. A control system includes a CPU 12 programmed to control operation of safe 10. CPU 12 also operates as a central network controller when interfaced with one or more remote/slave units and their associated components and keypads via a data bus. An interface module 14 connects the CPU to a keypad and electronic display device 16, an outer door lock mechanism 18, and an inner door lock mechanism 20. The CPU and its interface module are preferably mounted behind a protected inner door within the unit.

Figure 2:
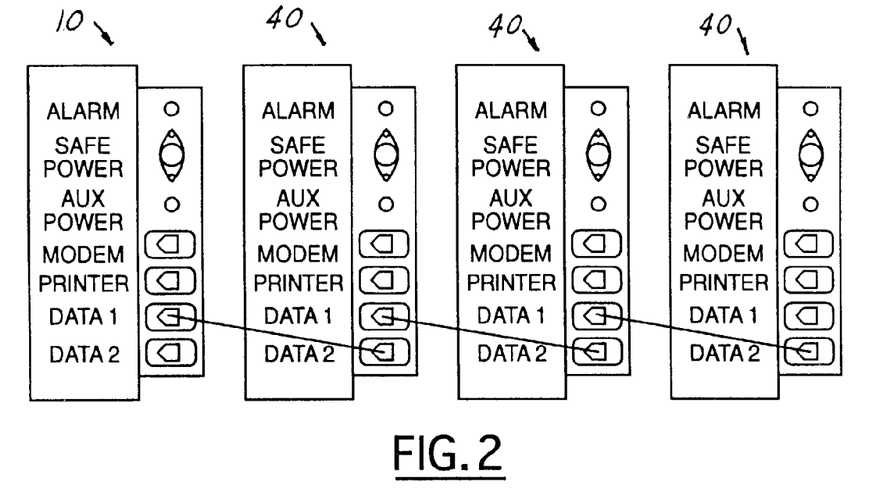
FIG. 2 is a front view of multiple wiring/connector interface panels connected together in a network.

A wiring/connector interface panel 22 is provided on the housing of the electronic lock and money collection/dispensing unit. In an exemplary embodiment, an alarm cable 24 can be feed through an opening 26 in the interface panel to provide connection to an external alarm system (not shown). A safe power connector 28 is provided to allow connection to an external switch-mode type power supply (not shown) arranged to produce voltages required by the display and other internal electronics of safe 10. An auxiliary power connection 30 can be provided for any devices such as a bill validator (described below) that require an additional power supply. A modem connection 32, such as a standard RJ-45 port, allows connection to a conventional external modem such as for remote diagnostics and/or network monitoring and reporting. Other standard cable connectors can be used. A printer connection 34, such as a standard RJ-45 port, is used to connect a printer to the electronic lock and money collection/dispensing unit. Finally, a DATA 1 port 36 and DATA 2 port 38 are provided to allow connection to other remote/slave electronic lock and money collection/dispensing units. More specifically, as shown in FIG. 2, the DATA 1 and DATA 2 ports are used to connect (in a daisy chain configuration) the central controller unit 10 to multiple remote units 40, including any associated electronic locks, validators, and dispensing systems. These remote units operate as slave units within the network.

The locking system hardware depends on the type of door. For example, inner doors can use basic spring-loaded knob locks. When an operator unlocks an inner door, the control system sends a control signal to a lock mechanism solenoid. Once the lock solenoid is energized, the knob can be turned to unlatch and open the door.

An outer door provides the first line of physical security. An inner door is any door that cannot physically be opened unless an outer door is first opened. The use of one or more inner doors allows general access to the safe for getting tills, change, and so forth while allowing larger deposit funds or valuables to remain secured behind an inner door. Instead of a knob, an outer door can utilize a handle controlled by energizing of a lock solenoid to allow the handle to be turned. Linkage connected to the handle retracts one or more lock bolts. Once retracted, the bolt(s) are held back by a detent allowing the door to be opened. When the door shuts, the bolts can be automatically re-engaged. The lock solenoid is de-energized to prevent the boltwork from retracting when attempting to turn the handle.

The lock mechanism (not shown) only responds to commands and replies to instructions from the control processor. A lock mechanism in a remote safe can be set-up to respond only to the central control unit. The lock is arranged to store basic data including an encrypted identification number, a list of the most recent log entries, and associated setup properties.

Door sensors (not shown) mounted in the lock and on the outer door sense door status and provide appropriate signaling to the control processor. Thus, if a door remains open too long, an alarm can be triggered by the control processor. The door sensors can signal the control processor to trigger a burglary alarm signal if a door is sensed as being opened without prior signaling from the control processor.

Money is placed behind a lock by making a drop. When cash is dropped, the user making the drop is credited for the money added to the system. Money is later removed from the system by opening the door in front of the cash. For example, if a Shift Supervisor makes a $200 manual drop to an inner compartment, a corresponding credit is logged. When money is removed such as for making a bank deposit, the person credited with opening the door is also credited with the withdrawal from the system.

Figure 3:
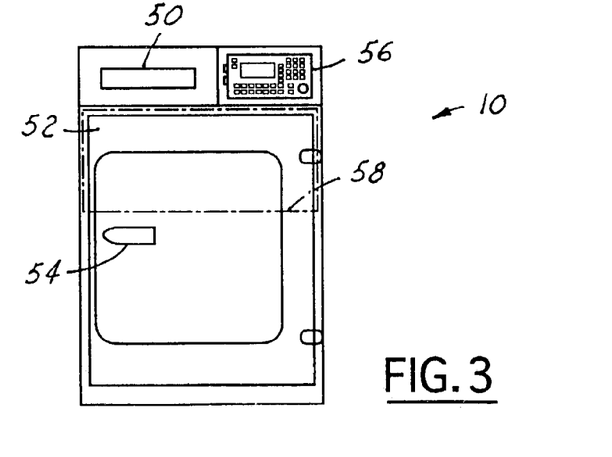
FIG. 3 is a front view of a safe in accordance with the first embodiment of the present invention.

FIG. 3 provides a front view of an exemplary unit in accordance with the first embodiment of the present invention. More specifically, a manual drop drawer 50 includes an opening to facilitate manual dropping of money/cash by allowing an envelope having the money and a drop receipt therein to be inserted into the electronic lock and money collection/dispensing unit. The drawer can be arranged to prevent extracting cash back through the opening after it is dropped inside. An outer door 52 is provided for example from ½ inch A-36 steel and equipped with a high quality boltwork for optimum security and efficiency in operation. An "L" style handle 54 turns 90° right (clockwise) to open the door. When the handle is turned, the bolts retract and the lock opens. When the door shuts, a spring loaded detent mechanism fires the bolts to lock the door. The handle automatically returns to the locked position. A keypad and display module 56 is shown mounted to the outside of housing. An inner compartment 58 is denoted in dashed outline to indicate an approximate location. This compartment is used to hold manual drops, and is protected by its own inner door and lock mechanism.

Figure 4:
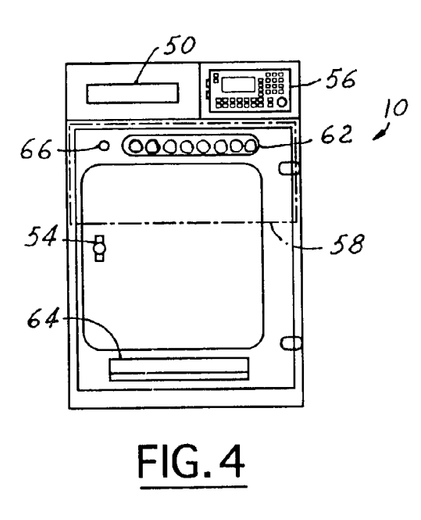
FIG. 4 is a front view of a safe in accordance with a second embodiment of the present invention.
Figure 5:
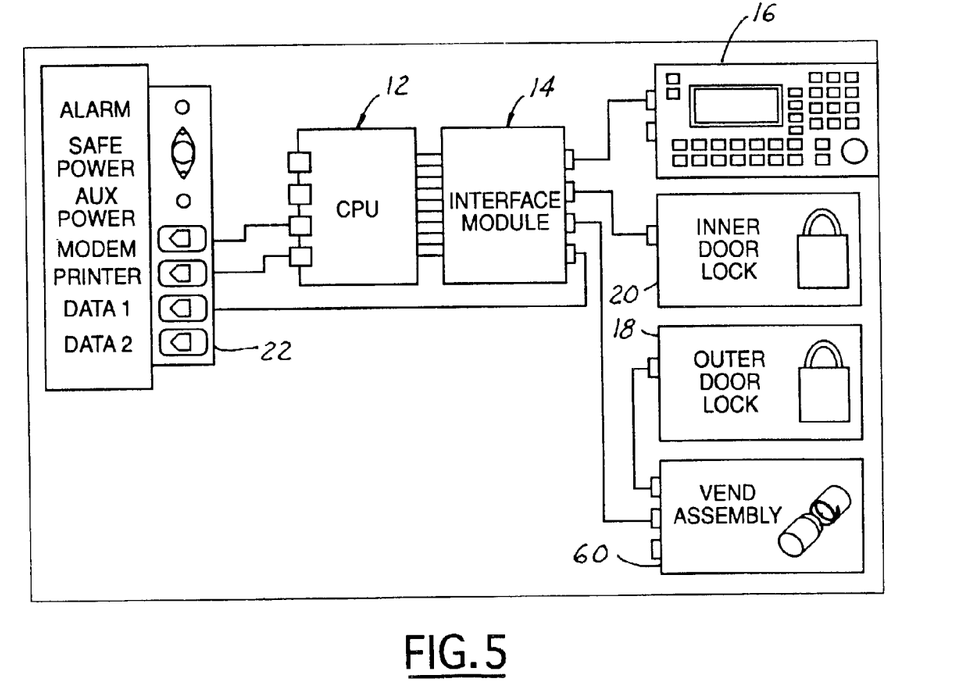
FIG. 5 is a block circuit diagram of a safe/central network control unit in accordance with the second embodiment.

Another exemplary embodiment is shown in FIG. 4. The associated block circuit diagram is shown in FIG. 5. In this embodiment, the electronic lock and money collection/dispensing unit 10 is equipped with a money dispensing/vending mechanism assembly 60. Like elements to those described above have been denoted with like reference numbers. More specifically, the housing, such as outer door 52, includes a set of round openings 62, i.e., "columns" or "chutes," formed therein to receive money-filled tubes to facilitate loading of tubes into the dispensing/vending mechanism. The chutes are individually numbered for system identification. Vended tubes drop out to a dispensary capture tray 64 located in the housing or outer door. The vending mechanism can be mounted on the inside surface of the housing or outer door, and include a series of optical sensors that track tube status, and a set of motors that control operation of tube vending baffles. The nature of the baffles prevents unauthorized access to the tubes from the opening in the housing created by the dispensary capture tray. The vending mechanism includes electronics coupled to interface module 14 and outer door lock 18.

Tubes are assumed to hold a certain amount of money based on the column in which they are loaded. For example, column 1 may be setup to hold rolls of pennies in its tubes. Each penny roll is standardized, such as to a value of $0.50. Therefore, each tube is accounted for at $0.50 each. Likewise, column 2 can be setup to hold tubes of nickels standardized at $2.00 each, and so on for the remaining columns. In this manner, the system can track in real-time the loading and vending of tubes, as well as report the credits, debits, and cash on hand based on the number of tubes added to or removed from each column of a particular dispensing unit.

A keyswitch 66, such as a Medeco® keyswitch, can be provided to control operation of a tubelock (not shown). The tubelock itself is a moveable bar that blocks the chute openings at the exterior surface of the door. When the tubelock is locked, tubes (and debris) cannot be loaded through the chutes. Such an arrangement prevents unauthorized loading as well as any attempts to extract a tube out through the chutes.

Figure 6:
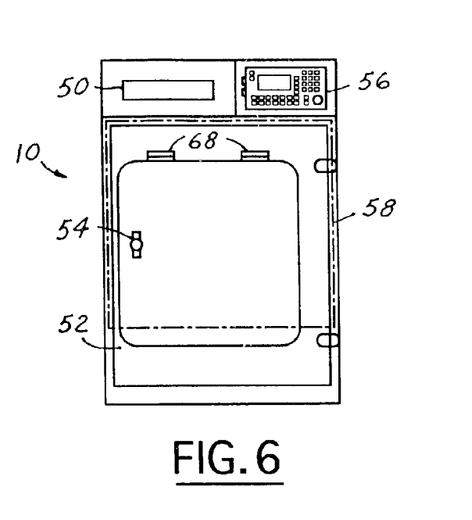
FIG. 6 is a front view of a safe in accordance with a third embodiment of the present invention.
Figure 7:
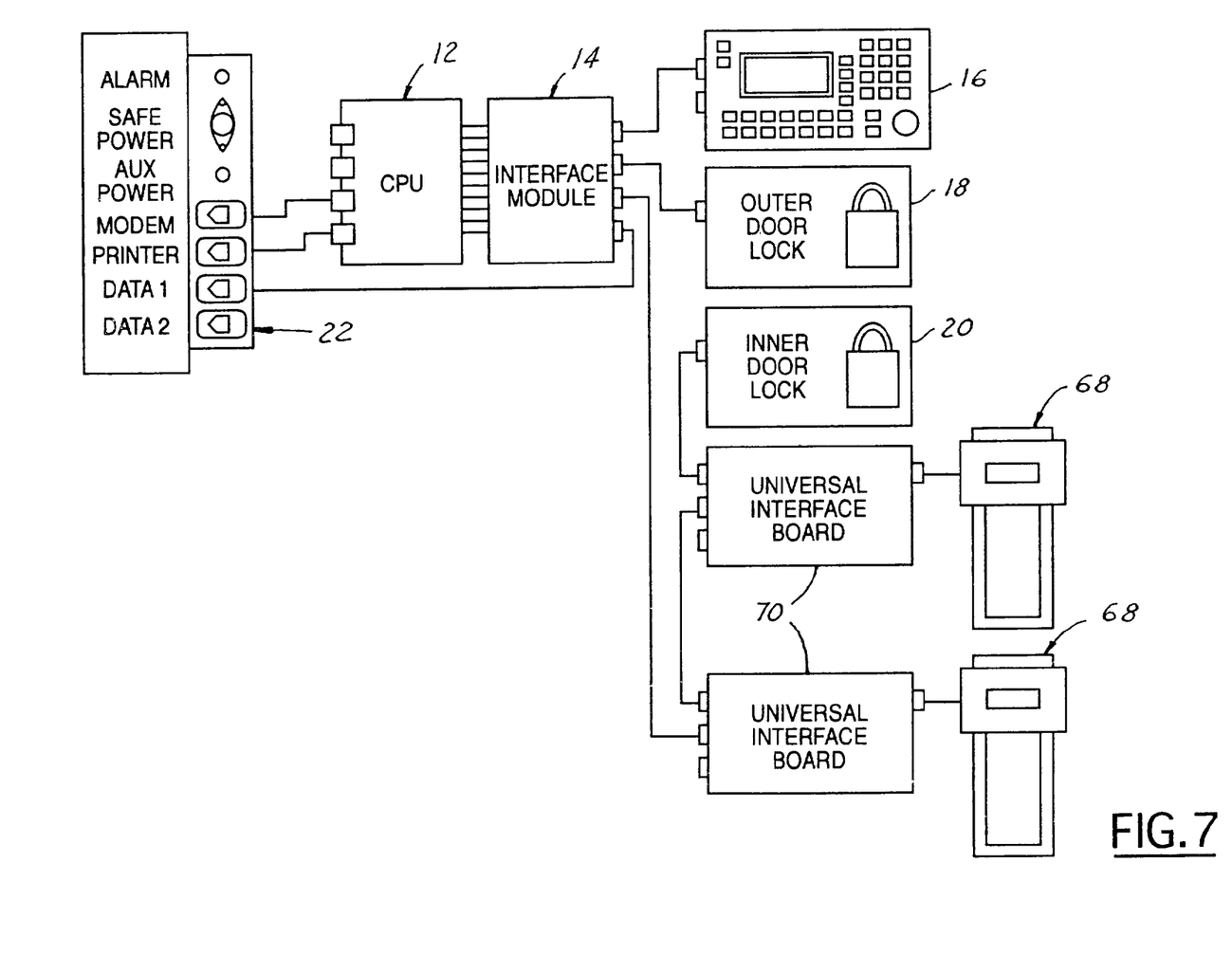
FIG. 7 is a block circuit diagram of a safe/central network control unit in accordance with the third embodiment.
Figure 8:
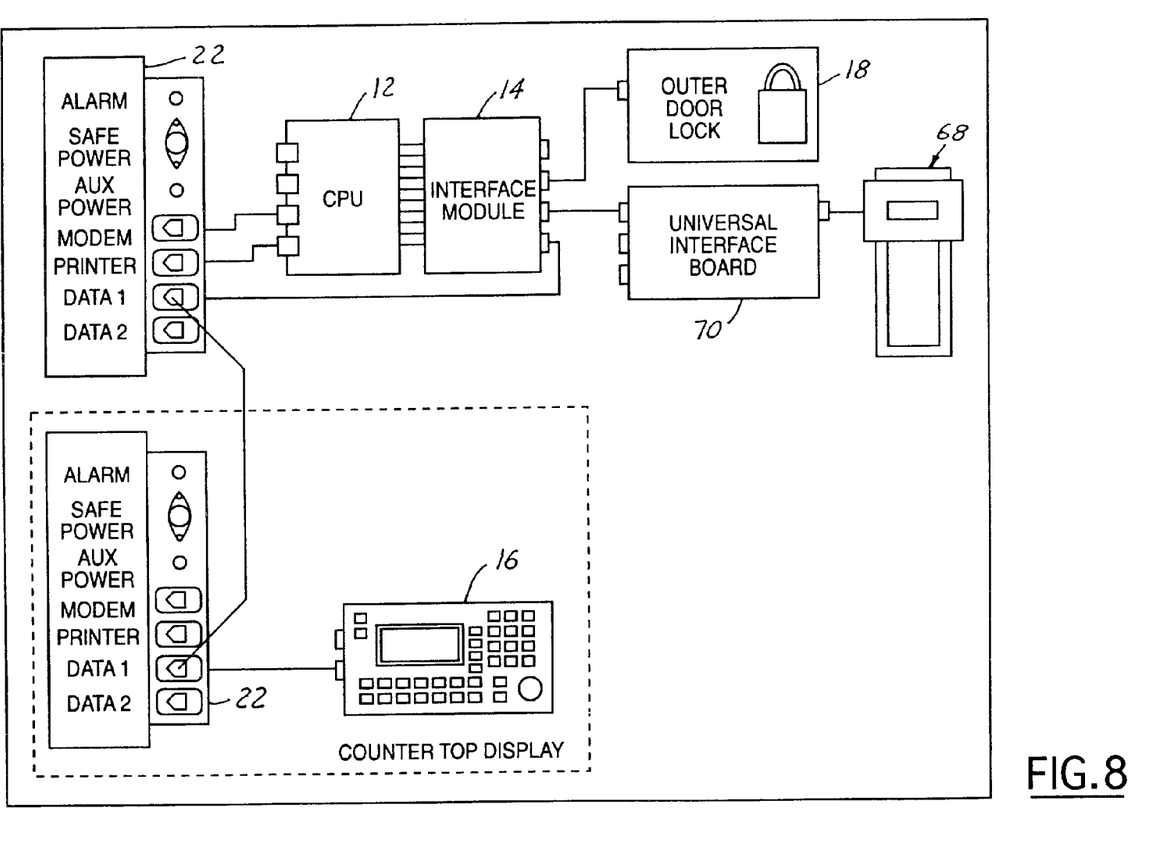
FIG. 8 is a block circuit diagram of a safe/central network control unit having a remote keypad module in accordance with the present invention.

Still another exemplary embodiment is shown in FIG. 6. The associated block circuit diagram is shown in FIG. 7. In this embodiment, one or more bill validators 68 are located on the unit. Each bill validator 68 includes an opening for insertion of paper currency, and a removable storage cassette (not shown) mounted internally for storage of bills that pass through the validator. Bill validation provides a secure and accurate method of collecting and storing incoming cash throughout the day. An operator enables a bill acceptor from the control panel and inserts one or more bills. The keypad/display control panel can be mounted to the exterior of the unit housing, or remotely as shown in FIG. 8 for convenient positioning such as on a counter near a cash register. The bill validator is arranged with appropriate hardware and programing to draw in the bill, validate the bill for authenticity and denomination, stack the bill in its cassette, and count the number and type of bills. The CPU stores the data into memory. A validator can be mounted to the housing such as via bracket assemblies located behind an outer and/or inner door.

A Universal Interface Board (UIB) 70 is used to interface each validator's electronics with the interface module 14. A UIB is arranged to respond to commands and replies to instructions from the device processor. The primary purpose of the UIB is to format data communicated between the validator and the CPU. The UIB stores basic data including an encrypted identification number, a list of the most recent audit trail entries, its own name, and associated setup properties.

A UIB can serve as a device processor. A lock control processor can also operate as a device processor. As shown, if more than one validator is used, each validator has its own UIB. One is made the master and connects directly to the main data bus, while the second UIB connects to the master UIB via an auxiliary data bus. One or more lock mechanisms can be coupled to communicate with the master UIB which, in turn, communicates with the system controller.

Figure 9:
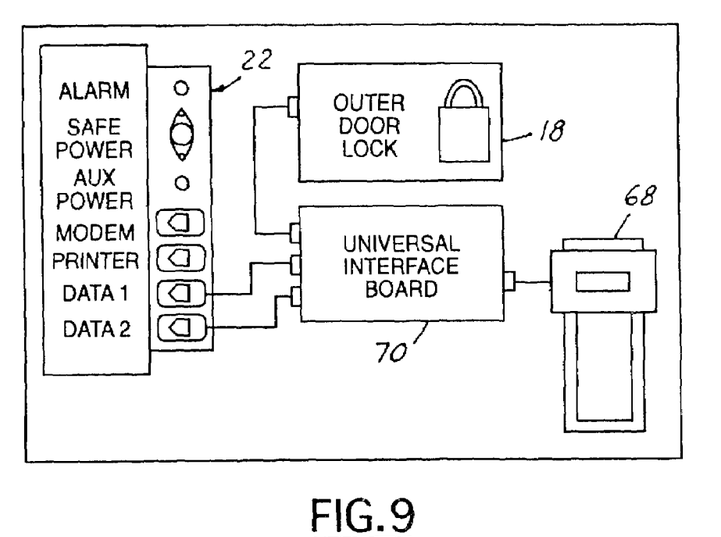
FIG. 9 is a block circuit diagram of a remote/slave safe unit having a bill validator.
Figure 10:
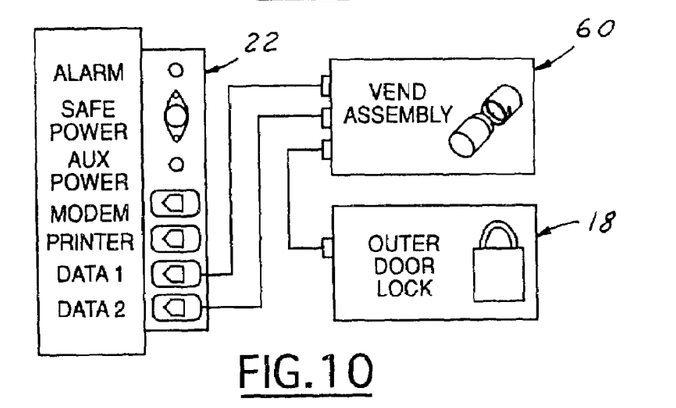
FIG. 10 is a block circuit diagram of a remote/slave safe unit having a vend mechanism.

As is demonstrated by the different embodiments, the present invention provides a very flexible system capable of custom configuration because the electronic lock and money collection/dispensing unit(s) can be arranged based on a desired configuration. For example, some applications may require an electronic lock and money collection/dispensing unit to perform advanced auditing capability, but do not require bill validation or dispensing capability. For those applications, the first embodiment is best suited. As shown in FIGS. 9 and 10, remote system units, i.e., units without a CPU/local control system, can be configured with bill validator(s) 68 and associated UIB(s) 70 and/or vend mechanisms 60. Such remote units and their associated components operate under control of the central control unit CPU.

Each device and/or component circuit board is provided with a unique serial number. The central controller is arranged to detect the presence of a device or component on the network probing serial numbers to identify those that are on the network. Following identification of the serial numbers, the device types are requested and network addresses are assigned to each serial number. Following this, each device is locked down with a CPU serial number and security tokens known only to the central controller and the device.

A device is added to the network by the central controller broadcasting a polling type message to determine if there are any devices coupled to the network that are not registered with the central controller. Any device that responses is then queried as to its type and any sub-components. The network information is then updated accordingly to add the device or component to the network.

Figure 11:
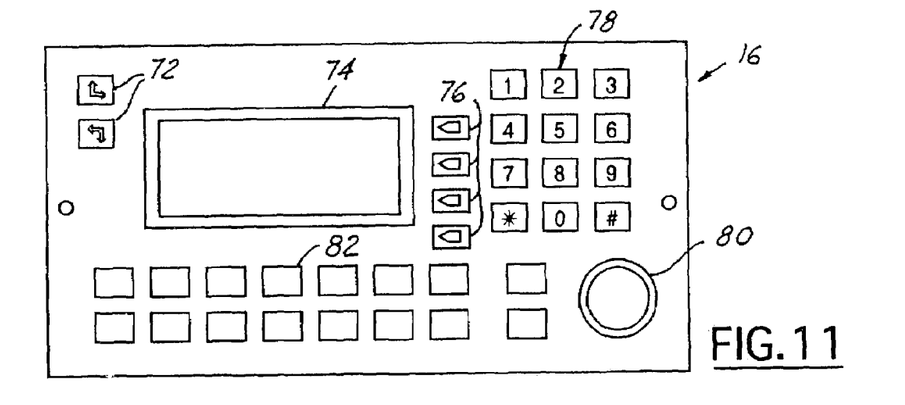
FIG. 11 is a front view of an exemplary embodiment of a display and keypad module.

An exemplary embodiment of a display and keypad module 16 is shown in FIG. 11. A set of buttons 72 are provided for scrolling through display options. The top scroll button scrolls up through a pick list or to the right if a line on the screen exceeds 20 characters, and the lower scroll button scrolls down or to the left. A fluorescent, LCD, or other suitable type of display 74 is provided.

A set of selection buttons 76 are provided, such as one for each row of the display, to allow a user to enter desired selections. A numeric keypad 78, including function keys such as an enter and clear key, is also provided. A key port 80 is provided to allow insertion and reading of electronic keys. Such an arrangement limits access to the system to authorized individuals.

A set of action buttons 82 are provided depending on the application. For example, a LOAD button is used when loading tubes to the dispensing system; a VEND button is used to dispense change tubes from the dispensing system; a DROP button is used when making manual or validator drops; an UNLOAD button is used to empty all tubes from a column for maintenance; a DOORS button is used when opening safe doors; a BUY CHANGE button is used when purchasing change from the dispensing unit by making a drop to a validator; a DISPLAY button is used to check system information such as time and date, various delays that may be in progress, and obtain general system information including technical support contact information; a PRGM (program) button is used to enroll or modify users, or to edit system setup parameters; a DROP SET button is used to setup drop operations; an ESC button allows the operator back up a full step at almost any point in almost any procedure, and also allows positive user completion of certain activities such as loading tubes or making validator drops; and a HELP button allows assistance information to be displayed.

As noted above, a safe may be configured to allow manual drops. Manual drops are made by inserting an envelope of money into a safe using a drop drawer. If the safe is not equipped with a validator, this is the only way (for accounting purposes) to put cash into the safe. The drop drawer is arranged to prevent extraction of the money back through the drawer opening once it has been closed and the drop completed. The drop drawer can also be equipped with an electronically controlled lock for additional security.

The central control unit is arranged through suitable programming to track and report the complete history of each unit in the system. In other words, all operations performed are recorded with a transaction number, time stamp, identifier of the person performing the action, and the details of the event, and communicated to the central control unit. For example, a unit will record the identity of the person who opens a safe door, when the door was opened, how long it remained open, and whether that user chose to remove any available cash from behind that door. This information is then sent to the central control unit.

The central control unit's CPU is programmed to generate various reports for printing or display. More specifically, financial reports can include individual user reports, cash (on hand), and end day reports. The system allows any user or operator, regardless of report permission, to view or print their own user report for a particular shift. Cash reports show actual cash present in the system by location. For example, money is reported per validator, per manual drop compartment, and per column of each dispensing unit. An audit report can be generated to show every event in the system during a specific time period. All financial data is derived from the audit. The audit can also be used to track personnel activity, such as the identity and time associated with a person logging into a particular feature. This sort of data is useful not only for theft detection and deterrence, but also for tracking operational trends. An audit data reported may be limited to a single user, system device, or event type for a given period.

As noted above, the central control unit is arranged to collect and sort information to provide reports detailing network or individual user activity. The central control unit can also be programmed to conduct a set of device and system self diagnostic routines to provide a status report regarding operation of hardware, communication, and alarm components.

As an example, a user report can be generated to print or view information such as: (1) a list of all bills validated by denomination (if any validators exist in the system) as well as all doors opened (including the number of times opened) by a user; (2) a list of all cash locations in the system and the amount of money dropped into each by the user as well as all vend assemblies in the system and the amount of money loaded into each by the user; (3) a list of all cash locations in the system and the amount of money removed from each by the user; (4) a total of all transactions associated with the user including money added to all manual drops and validator drops, cash removed from drops, and total taken from vend (vend or unload), as well as a net total for the user.

An end day report includes a series of operator reports (one for each operator in the system who was active during the business day), and a copy of a cash report. The end day report also includes a net activity section that lists bills validated by denomination (if any validators exist in the system) and lists all doors and how many times each were opened. A net totals section lists total money added to all manual drops and validator drops, lists total deposits (cash removed from drops) and total taken from vend (vend or unload), and lists the net total for the user.

A cash report includes a vend section that shows the total number of tubes and the amount of money in each column per vend assembly, as well as the total of all vends. A validator drop cash section shows the amount of money in each validator by validator name, as well as the total amount of validated money. A manual drop cash section shows the amount of money in each manual drop location, as well as the total money in manual drops. A total money in system section shows the combined sum of moneys in vend, validated drops, and manual drops.

An audit report includes a report data section showing the report start and end time/date, device, user, and event report criteria. The report itemizes all events at each unit by identifying the event, the location, and the user triggering the event. In other words, the audit report can provide an activity recap for each unit in the system by accumulating financial information such as the amount of money loaded, unloaded (showing a total overage or shortage, if applicable), vended, manually dropped, and dropped to validators, as well as security information such as the number of times doors were opened. In addition, events such as an attempt to log into the system using an incorrect PIN are reported and tracked. The system can be programmed to determine if the next entry after such an incorrect attempt is valid, and assume accordingly that the user simply made a mistake when originally entering the PIN.

A configuration report provides an exhaustive list of system devices, all components of each device, and all variables of each component. A system report can be generated to track messages that are initiated by the system instead of the user. For example, a report can be generated detailing detection of a bill jam in a particular validator device, including subsequent repair activity performed such as power-up and power-down cycling.

All user data, such as identification, identification type (User Number or electronic key), name, and user permissions, is stored in the system and may be printed or displayed. System configuration information such as device arrangement and communication setup, column values, delays, timelocks, is included on a configuration report. If the integrity of the system or any of its components is in question, a diagnostic status report is available. This report lists all components and their operational status. A system report is also available to list all system messages (errors) generated and logged during the report period. This report is a very effective way of monitoring the system for full validators, bill jams, or other system generated audit entries.

Users may be added with any combination of authority and any type of available identifier. A system identifier is required, and may be in the form of a user number, electronic key, or other suitable arrangement. For example, a Biometrics® fingerprint reader can be installed to provide recognition of an index finger for identification. The purpose of an identifier is to provide the system with a way to determine who is accessing it. Once identified, the system can determine what permissions have been assigned to that user, as well as the activity history of that person. A name and personal ID are stored in the system and referenced to the identifier. Thus, when a user logs-in, the system can identify the user by name on the display as well as on any printed or displayed reports.

Identifiers are verified by a PIN, which is associated with a user upon enrollment into the system. One exception is an armored car identifier, which preferably uses verification from a second enrolled user instead of a PIN associated with the armored car personnel. Users may change their own PIN numbers at will, or as required by the system.

Enrollment involves entering a user's identifier, personal ID (such as a social security number), temporary PIN, name, and default permission level. Once enrolled, the user's PIN and permission levels may later be modified. The name and personal ID cannot be changed. To associate a different personal ID or name with an identifier, the user (identifier) must be deleted from the system and enrolled again as a new user.

A user may become inactive by one of two methods. An authorized user can inactivate a person to disable their access without actually removing them from the system. This can be done for example to a user who is on vacation or temporarily transferred. The second method is automatic inactivation. This occurs when the system does not detect a user accessing the system or safe for a predetermined amount of time, such as one or two months. Once a user becomes inactive, an authorized user may allow the user to become active again by assigning a temporary PIN. Note that a temporary PIN may be issued to a user even if they are already active.

In further accordance with the present invention, the central control unit is programmed to recognize different levels authority or permission to access different operations of the system. Nearly all system operations require the user to have a certain level of permission. For example, common tasks such as making drops or vending change is usually granted to the majority of users, while certain doors may be off-limits to all but a few users. Individuals are assigned a default permission level when they are enrolled. Electronic keys may be pre-coded with specific permissions, or may be set to operate using a system default permission level. Permission defaults as well as individual user permissions may be modified. A user cannot enroll other users with a higher default permission level than their own. In addition, a permission level can be assigned as a function of the time or date, i.e., the permission is valid only during the assigned time or date.

In one embodiment, the system recognizes the following default permission levels. The first level is a door permission. Users with a general door permission may open any door belonging to an access group to which they have access. Any door may be assigned to any of 32 access groups. A user will have access to specific groups and the doors assigned thereto. In situations where dual access is provided, or verifying armored car override access, the secondary user still must have door access.

The second permission level is a vend permission, which is similar to door permission in that the same 32 access groups can be used. Every column on every system dispensing unit is assigned a group number. For a user to vend a column, the user must have general vend permission and access to the group assigned to that column. Load and unload functions, also related to the dispensing system, are globally allowed or disallowed by permission, without regard to group number.

The third permission level is a drop permission. Users need general drop permission in order to make drops, whether by validator or manual drop. In addition, drop permission is required in order to access the Buy Change and any other related drop functions.

The next level of permission is a run report permission. While all enrolled users may run their own operator reports, running any other report requires the applicable report permission. The reason for specifying particular report permissions for particular users is to allow certain people to run some reports, such as an end day report, without being able to access other reports such as an audit report. Users who load or unload dispensing systems need to be able to run a cash report, but may not have any need to run an enrolled user report, and so forth.

Another level of permission allows a user to adjust the system or unit clock by one or two minutes. Setting the system's clock (time, date, and DST) can be controlled by a separate, advanced permission.

User functions require a permission level to allow a user to enroll users, edit users, set user permissions, and edit system level user functions. Additional user parameters may be set by advanced users, such as adding or editing default permissions, setting PIN length and life, and setting auto delete and auto inactivate times.

The following permissions can be generally restricted to loss prevention or security manager level personnel:

User Related:
   Set Default Permissions
   Set PIN Length
   Set PIN Life
   Set Auto Delete Time
   Set Auto Inactivate Time Access Related:
   Set Lock Delays
   Set Lock Timelocks
   Set Lock Access Time
   Set Lock Alarm Time
   Set Vend Delay
   Set Variable Vend Delay
   Set Vend Timelock
   Set Unload Delay
   Set Unload Timelock
   Set Dual Key Accounting Related:
   Set Cash
   Set Column Values & Levels
   Set Receipt Printing
   Set Validator Acceptance Direction
   Set Validator Acceptance Denominations
   Set Auto End Day Time
   Set Variable Vend Time Clock Related:
   Time
   Date
   Auto Daylight Savings Enable System Related:
   Device Names
   Delete Device
   Set Idle Text
   Set Modem Configuration
   Set Remote Configuration.

Factory level permissions are provided for the following advanced system functions:
   Master Reset Add Device
   Set Serial Number Set Company Code Set Key Required
   Set Fingerprint Required Set Lock Behind Set Lock Sensors Set
   Solenoid Time
   Set Remote Solenoid Actuate Button.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An electronic lock and money control system comprising:
   at least one safe comprising:
      a housing having an interior compartment for securing money, and an outer door having an electronic lock mechanism to control access to the interior compartment;
      a data input device;
      an electronic display;

a connector interface mounted to the housing; and a control system arranged to communicate with the data input device, electronic display, connector interface and electronic lock mechanism, wherein the control system includes a processor programmed to control operation of the electronic lock, as well as operate as a central system controller when connected to at least one other remote safe via the connector interface to monitor and accumulate financial and operational information for each remote unit.

2. The system of claim 1 wherein the at least one safe further comprises a bill validator apparatus mounted to the housing for receiving and validating bills of various denominations, and a storage device located within the safe for storing all validated bills, wherein the processor is programmed to maintain a record of all received and validated bills.

3. The system of claim 1 further comprising a cash dispensing apparatus mounted to the housing, the cash dispensing apparatus including a set of openings in the housing arranged to be loaded with containers each containing money of a predetermined value, and a separate opening and dispensing tray in the housing to dispense money containers for removal from the safe.

4. The system of claim 1 wherein the control system is further programmed to accumulate and track deposits and withdrawals of money, recognize user identification data, and store transaction data and associated user identity data in a memory; wherein the processor is further arranged to process and sort stored transaction and operational data to generate an audit report and accounting reports.

5. The system of claim 1 wherein a remote safe unit is connected to the connector interface, the remote safe unit comprising a bill validator apparatus mounted to a housing thereof for receiving and validating bills of various denominations, and a storage device located within the remote safe for storing all validated bills, wherein the processor is programmed to maintain a record of all bills received and validated in the remote safe.

6. The system of claim 1 wherein the connection interface comprises a communications port to allow communication between the control system and a remote computer.

7. The system of claim 1 wherein a remote safe unit is connected to the connector interface, the remote safe unit comprising a cash dispensing apparatus mounted to a housing thereof, the cash dispensing apparatus including a set of openings in the housing arranged to be loaded with containers each containing money of a predetermined value, and a separate opening and dispensing tray in the housing to dispense cash containers for removal from the safe, wherein the processor is programmed to maintain a record of all money load and dispensed from the remote safe.

8. The system of claim 1 wherein the processor is programmed to recognize different levels of user system access authority.

9. The system of claim 1 wherein one or more remote safe units are connected to the connector interface, and the processor is further programmed to accumulate and track deposits and withdrawals of money, recognize user identification data, and store transaction data and associated user identity data in a memory for each remote unit, wherein the processor is arranged to process and sort stored transaction and operational data to generate an individual and totaled audit and accounting reports.

10. The system of claim 9 wherein the processor is arranged to selectively generate financial reports including individual user reports, cash showing actual cash present by location, and end day reports, as well as an audit report itemizing the occurrence of selected events during a specific time period.

11. A network of interconnected electronic locking and money control devices comprising:

a central processing system integrated with one of the electronic locking and money control devices and arranged to control operation of the integrated device, wherein the central processing system is connected to all other network devices, and further arranged to communicate with all the other network devices and provide network control of all the other devices.

12. The network of claim 11 wherein the central processing system is arranged to automatically detect and assign network addresses for devices added to the network.

13. The network of claim 11 wherein the other network devices comprise a data entry subsystem arranged to receive and recognize user identification data, and transmit the data to the central processing system, wherein the central processing system is arranged to determine whether the user is authorized to access the system, and controlling operation of the network device based on the authorization determination.

14. The network of claim 11 wherein the data entry system is arranged to receive the user identification data in the form of at least a user number, electronic key, or biometric identification.

15. The network of claim 11 wherein a network device comprises an electronic lock and control arrangement.

16. The network of claim 11 wherein a network device is a cash dispensing apparatus, the cash dispensing apparatus including a set of openings arranged to be loaded with containers each containing cash of a predetermined value, and a separate opening and dispenser to dispense cash containers for removal from the safe, wherein the cash dispensing apparatus is arranged to maintain an accounting of all containers and provide a report to the central processing system.

17. The network of claim 11 wherein a network device comprises a universal interface designed to communicate with a plurality of types of bill validators arranged to receive and validate bills of various denominations, and a storage device for storing all validated bills, wherein the universal interface is programmed to maintain a record of all received and validated bills and provide a report to the central processing system.

18. The network of claim 11 wherein the central processing system is fully programmable via a data entry subsystem arranged to receive and recognize user identification data, and transmit the data to the central processing system.

19. The network of claim 11 wherein the central processing system is programmed to recognize different levels of user system access authority.

20. The network of claim 19 wherein the central processing system is programmed to recognize a level of user system access authority as a function of time or date.

21. The network of claim 11 wherein the central processing system is programmed to assign selected devices to an access group to provide flexible levels of user access.

22. The network of claim 11 wherein the central processing system is programmed to accumulate and track deposits and withdrawals of money from all devices on the network, recognize user identification data, and store transaction data and associated user identity data in a memory for each device connected to the network, wherein the central processing system is arranged to process and sort stored transaction and operational data to generate an individual and totaled audit and accounting reports.

23. The network of claim 11 wherein the central processing system is programmed to develop entities of money that comprise one or more of the devices connected to the network and process the developed entities as a single device for access and accounting purposes, while also being able to track each device separately.

24. The network of claim 23 wherein the central processing system is programmed such that entities of money may comprise other entities of money as well as one or more of the devices on the network or remote sub-networks and treat them as one for access and accounting purposes, without losing the ability to track each entity of money or device separately if needed.

25. The network of claims 11 wherein the central processing system is arranged to selectively generate financial reports including individual user reports, a cash report showing actual cash present by location, and end-day reports, as well as an audit report itemizing the occurrence of selected events during a specific time period.

26. The network of claim 11 wherein each device connected to the network is arranged to store individual configuration information, monetary totals and a selected audit information to facilitate replacement of the central processing system.

\* \* \* \* \*